United States Patent [19]

Duffy

[11] 4,434,866
[45] Mar. 6, 1984

[54] SPEED-SENSITIVE POWER STEERING SYSTEM

[75] Inventor: James J. Duffy, Livonia, Mich.

[73] Assignee: Ford Motor Company, Dearborn, Mich.

[21] Appl. No.: 396,982

[22] Filed: May 19, 1982

[51] Int. Cl.³ .............................................. B62D 5/08
[52] U.S. Cl. ................... 180/143; 91/375 A; 91/434
[58] Field of Search ............... 180/143, 142, 141, 132; 91/375 A, 434

[56] References Cited

U.S. PATENT DOCUMENTS

| 3,690,400 | 9/1972 | Uchiyama et al. | 180/142 |
| 3,692,137 | 9/1972 | Inoue | 180/142 |
| 3,744,515 | 7/1973 | Inoue | 137/494 |
| 3,777,839 | 12/1973 | Uchiyama | 180/143 |
| 3,877,540 | 4/1975 | Masuda et al. | 180/143 |
| 3,994,361 | 11/1976 | Nishikawa et al. | 180/143 |
| 4,000,785 | 1/1977 | Nishikawa et al. | 180/143 |
| 4,063,490 | 12/1977 | Duffy | 91/467 |
| 4,119,172 | 10/1978 | Yanagishima et al. | 180/141 |
| 4,154,317 | 5/1979 | Nishikawa et al. | 180/143 |
| 4,310,063 | 1/1982 | Nishikawa | 180/143 |

Primary Examiner—John A. Pekar
Attorney, Agent, or Firm—Donald J. Harrington; Keith L. Zerschling

[57] ABSTRACT

A power steering mechanism for controlling the dirigible wheels of an automotive vehicle comprising a fluid motor that provides a power assist to manual steering effort applied to the steering gear mechanism wherein a hydraulic reaction mechanism (44) applies a reaction torque to the driver operated steering controls (82) to effect variable steering efforts thus making it possible to reduce the steering efforts at low vehicle speeds (e.g., while parking the vehicle) and increasing the steering effort as the vehicle speed increases, the variable effort being accomplished by reaction pistons (96, 98, 100 102) that are subjected to steering pressure.

3 Claims, 6 Drawing Figures

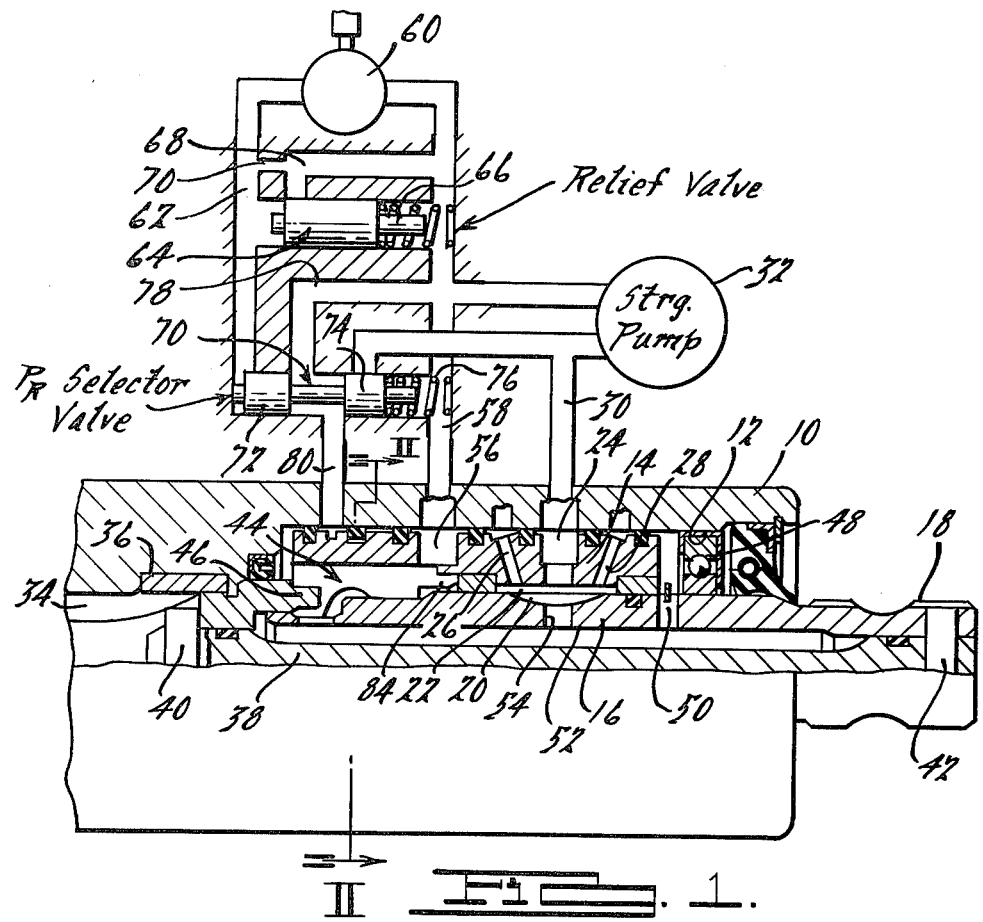
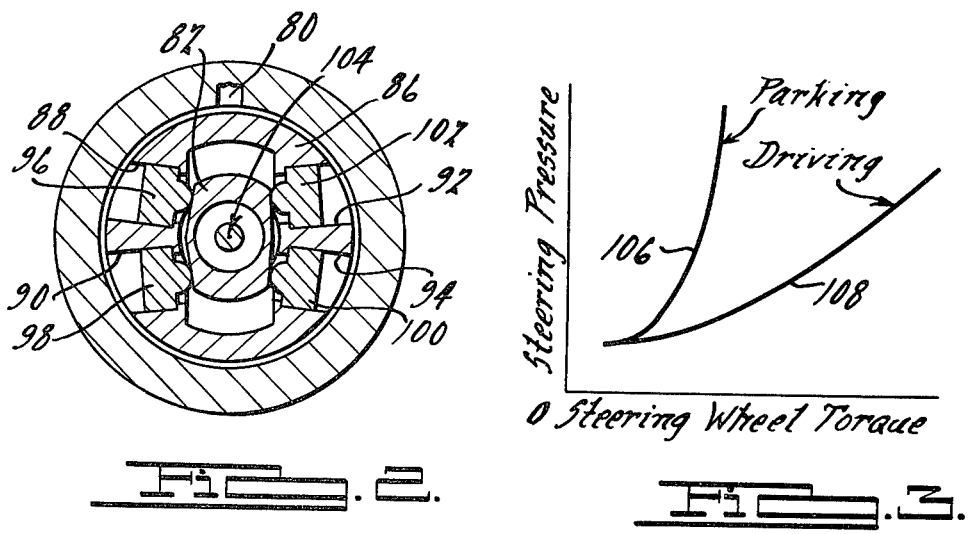

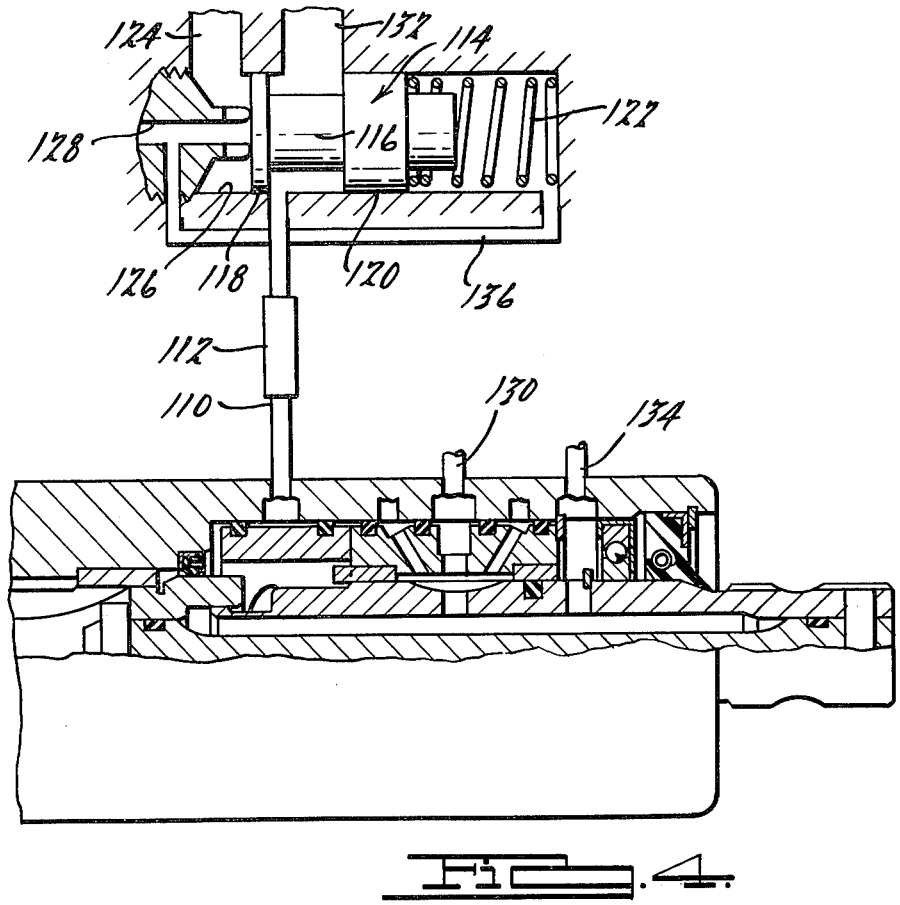
FIG. 4.
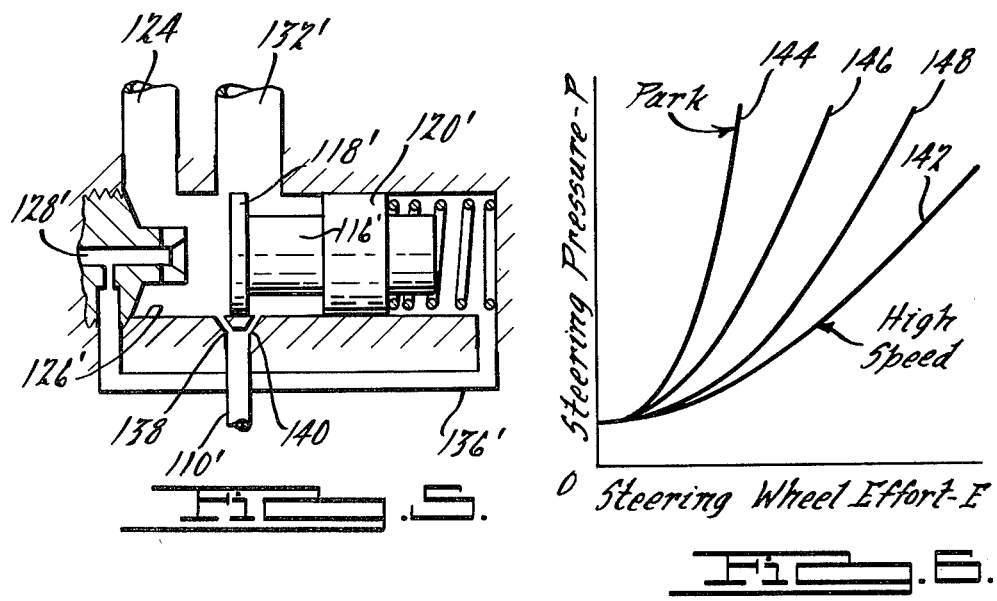
FIG. 5.
FIG. 6.

SPEED-SENSITIVE POWER STEERING SYSTEM

TECHNICAL FIELD

My invention relates to power steering gears and to valves for controlling steering torque reaction.

BACKGROUND ART

My invention comprises improvements in power steering systems of the kind shown, for example, in U.S. Pat. No. 3,877,540. Also of interest are U.S. Pat. Nos. 3,690,400; 3,692,137; 3,744,515 and 3,777,839, which illustrate the state of the art.

It is common practice in power steering gear mechanisms of the kind disclosed in this specification to use a steering shaft that is connected by means of a torsion rod to a steering pinion or steering sector gear in a vehicle steering system by means of a torsion rod. A rotary valve comprising an inner valve member and a surrounding valve sleeve is located in a fluid circuit between a fluid motor and a power steering pump for establishing a variable pressure in the fluid motor, the output or driven member of which is connected to the steering shaft of the steering system to provide a power assist to the manual steering effort of the driver of the vehicle. As torque is applied to the steering shaft, the inner valve member, which is connected to the steering shaft, is displaced angularly with respect to the valve sleeve, the latter being connected to the steering pinion or sector gear.

It is desirable in arrangements of this kind to provide a reduced steering effort when the vehicle is operated at low speeds, as is the case when parking the vehicle, and to provide an increased steering effort when the vehicle is operated under straight-ahead driving conditions at high speeds. For this purpose reaction cylinders have been provided to resist relative displacement of the inner valve member with respect to its cooperating sleeve. Such devices are shown, for example, in U.S. Pat. Nos. 3,690,400; 3,692,137; 3,744,515 and 3,777,839. These devices comprise a reaction piston acting within a reaction pressure chamber, and the pressure that is made available to the reaction chamber is dependent upon speed thus providing relatively effortless steering performance at low speeds and providing a stabilized steering performance during relatively high speed driving. U.S. Pat. No. 3,877,540 expands upon this early concept by providing a zero power assist when the valve members are in a relatively centered position, one with respect to the other, and that zero power assist condition remains until the resisting torque established by a speed sensitive pressure applied to the reaction pistons is overcome thereby allowing the steering valve to assume a relatively displaced position and to initiate a power assist operating mode.

DISCLOSURE OF INVENTION

Unlike these prior art teachings, the improvements of my invention comprise a power steering mechanism having rotary valve elements wherein pressure reaction pistons are subjected to a steering pressure that is developed by the valve mechanism in cooperation with the positive displacement pump and flow control valve. The steering effort does not depend upon a governor pressure or a separate vehicle speed sensitive pressure that acts on the reaction pistons for the steering valve.

The improved steering pressure sensitive power steering system of my invention creates a hydraulic reaction pressure that equals the power steering pump intake pressure while parking the vehicle thus causing light steering efforts in that operating mode. The magnitude of the steering effort while parking or while maneuvering the vehicle at low speeds is controlled only by the torsion bar that resists relative displacement of the inner valve member with respect to the valve sleeve. As the vehicle speed increases a speed sensor pump output pressure driven by a driven part of the vehicle driveline increases. At a predetermined speed the reaction pressure that is developed is sufficient to operate a selector valve thereby causing the reaction chambers in the steering gear itself to become ported to the steering pressure of the power steering pump. As steering pressure increases, the reaction pressure increases accordingly.

In one embodiment of my invention a vehicle speed sensing signal, such as an automatic transmission governor pressure valve, can be used to operate the selector valve thus causing the reaction chambers to be connected through the power steering pressure of the power steering pump as communication between the reaction chambers and the suction side of the pump is interrupted. In still another embodiment of my invention, I have made provision for providing steering efforts in accordance with the concept described in the foregoing paragraphs although the steering efforts are proportional to the magnitude of the steering pressure.

BRIEF DESCRIPTION OF THE DRAWINGS

FIG. 1 shows in cross-sectional form and in partial schematic form a power steering gear mechanism together with a flow control valve and power steering pump for a wheeled automotive vehicle.

FIG. 2 is a cross-sectional view showing the reaction cylinders for the gear mechanism of FIG. 1 as seen from the plane of section line 2—2 of FIG. 1.

FIG. 3 is a chart that shows the relationship between steering pressure and steering effort for the mechanism of FIG. 1.

FIG. 4 is a modified form of my invention which includes a steering gear mechanism and a flow control valve that establishes a variable reaction pressure on the reaction cylinders for the steering gear mechanism.

FIG. 5 shows a modification of the proportional reaction pressure valve assembly of FIG. 4 which effects a gradual increase in the proportionality of reaction pressure to steering pressure.

FIG. 6 is a chart showing the relationship between steering pressure and steering effort for a steering gear mechanism of the kind described here when it is provided with a valve of the kind shown in FIG. 5.

BEST MODE FOR CARRYING OUT THE INVENTION

Numeral 10 in FIG. 1 designates a power steering gear housing. It is provided with a valve chamber 12 in which is positioned a rotary valve sleeve 14 and a cooperating inner valve member 16. The valve 16 forms a part of or is connected to a steering shaft 18 which is adapted to be connected to a steering shaft to which the vehicle operator may apply steering torque. Reference may be made to my U.S. Pat. No. 4,063,490 for a description of a typical rotary valve mechanism for use in controlling the steering pressures in a steering gear mechanism of the kind disclosed here.

The inner valve member 16 has external valve lands 20 which register with internal valve lands 22 on valve sleeve 14. As the valve member 16 is displaced angularly with respect to sleeve 14, the lands 20 and 22 control the degree of communication between a steering pressure port 24 in the valve sleeve and each of two distribution passages 26 and 28, which extend to opposite sides of a pressure movable member such as a power steering piston, the latter in turn being connected to a vehicle steering linkage. Port 24 communicates with power steering pump pressure passage 30 that is connected to the output side of a power steering pump 32.

A steering gear 34 is rotatably supported on the left hand end of the steering housing 10, and it is adapted to mesh with a gear rack as described in U.S. Pat. No. 4,063,490. Bushing 36 rotatably supports gear 34.

One end of torsion rod spring 38 is pinned as shown at 40 to the right hand end of the gear 34. The opposite end of the torsion rod spring 38 is pinned at 42 to the driver controlled shaft 18. Valve sleeve 14 is adapted to be connected positively to the right hand end of gear 34. A positive driving connection between the sleeve 14 and the gear 34 is achieved by a hydraulic reaction mechanism generally identified in FIG. 1 by reference numeral 44. That reaction mechanism will be described with respect to FIG. 2 subsequently.

A limited amount of lost motion is provided between the mechanism 44 and the right hand end of the gear 34 by means of an interlocking lug and slot device 46. Under normal steering conditions torque is transmitted through the torsion rod 38 from the shaft 18 to the gear 34. If for some reason steering torque should exceed a predetermined value, torque then is transmitted directly from the shaft 18 and through a valve member 16 to the gear 34 through the lost motion connection. When torque is applied to the shaft 18 in one direction, fluid pressure is distributed from the passage 30 to the control passages 26 and 28. Pressure in passage 26 increases, and a corresponding decrease in pressure occurs in passage 28. If torque is applied in the opposite direction, the pressure in passage 28 increases; and a corresponding decrease occurs in passage 26.

A bearing 48 maintains registry between the valve elements, and radial port 50 on the left hand side of the bearing 48 communicates with the central opening 52 in the valve member 16 through which the torsion rod 38 extends. That opening 52 communicates with exhaust port 54. Internal porting, not shown, connects radial port 50 and region 56 to pressure return passage 58, which communicates with the intake side of the pump 32. Region 56 is located at the left hand side of the valve sleeve 14.

A vehicle speed sensor pump 60 provides a vehicle speed pressure $P_C$ to passage 62. Pump 60 may be a pump that is connected through gearing to the tail shaft of a vehicle transmission. However, it may be replaced by a speed governor such as the governor of an automatic transmission in a vehicle driveline. The intake side of the pump 60 communicates with the supply passage 58 for the pump 32. Pump 32 is driven by the vehicle engine in known fashion.

A pressure relief valve 64 comprises a valve spool that is biased in a left hand direction as seen in FIG. 1 by valve spring 66. It controls the degree of communication through a parallel flow passage 68 for the pump 60. A constant bleed orifice 70 bypasses the relief valve 64. The relief valve limits the pressure build up in the passage 62 to a useful value.

Arranged in parallel disposition with respect to the relief valve 64 is a selector valve 70. This comprises a valve spool having spaced lands 72 and 74. The left hand end of the land 72 communicates with passage 62. The right hand end of the land 74 communicates with the pump supply passage 58. The selector valve is biased in a left hand direction by valve spring 76.

When the valve 70 is positioned as shown in FIG. 1, communication is established between supply pressure passage 78 and reaction pressure passage 80. Supply passage 78 communicates with supply passage 58. The reaction pressure passage 80 is subjected to a reaction pressure $P_R$ and it is in communication with the reaction chambers that will be described with reference to FIG. 2.

A reaction element of generally rectangular shape forms a part of the reaction mechanism 44, as seen in FIG. 2 at 82. It is connected directly to the rotary valve member 16 by means of a driving connection 84 seen in FIG. 1. FIG. 2 shows also a sleeve element 86 which surrounds the element 82 and which is formed with four reaction cylinders identified separately by reference characters 88, 90, 92 and 94. Each of these reaction cylinders receives a reaction piston as seen at 96, 98, 100 and 102. Each reaction piston is formed with a round nose which directly engages element 82 at a point offset from the central axis 104 of the valve mechanism.

It may be seen from FIG. 2 that when pressure is distributed to the reaction cylinders 88 through 92, their respective pistons tend to resist rotation of the element 82 and valve element 16 with respect to the valve sleeve 14. The radially outward ends of the cylinders 88 through 92 communicate with passage 80 seen in FIG. 1. Each of the pistons 96 through 102, when they assume their innermost positions, engage a shoulder formed on their respective cylinders 88 through 92, thereby limiting the inward movement thereof. Thus movement of element 82 in a counterclockwise direction relative to element 86, as viewed in FIG. 2, would be resisted by any reaction pressure in chambers 88 and 94. Similarly, any movement of the element 82 with respect to the element 86 in a clockwise direction as viewed in FIG. 2 would be resisted by any reaction pressure in reaction chambers 90 and 92.

During steering maneuvers of the vehicle under straight ahead driving conditions at relatively high speeds, the selector valve 72 is shifted in a right hand direction against the opposing force of the spring 76 and against the opposing force of the suction pressure in passage 58. This interrupts communication between reaction pressure passage 80 and passage 78 and establishes communication between passage 30 and passage 80. This causes an increase in pressure in the reaction chambers of FIG. 2 thereby causing an increased steering effort during steering maneuvers of the vehicle in such a high speed driving mode. At low speeds, when the speed sensor pump pressure in passage 62 is insufficient to overcome the force of spring 76 and the force of the suction pressure in passage 58, the valve 70 will shift in the left hand direction thereby establishing communication between reaction pressure passage 80 and the suction pressure passage 78. This reduces the degree of torque reaction established by the reaction pistons and reduces the steering effort on the shaft 18 during steering maneuvers. This dual operating mode is illustrated in the characteristic curve of FIG. 3 where we have plotted steering pressure against steering wheel torque during parking maneuvers with the selector valve 70 in a left hand direction. The characteristic curve showing the relationship between these two variables is illustrated at 106. On the other hand at high speeds when the selector valve is in a right hand position and the steering pump pressure in passage 30 is distributed to reaction pressure passage 80, the characteristic curve is as shown at 108. The slope of the characteristic curve changes dramatically as the steering mechanism changes from one operating mode to the other.

In the embodiment of FIG. 4 I have achieved the dual operating mode characteristics described with reference to FIGS. 1 through 3, but I have achieved this without the necessity of providing a separate selector valve. Instead I have adapted the flow control valve that is part of the power steering pump mechanism to obtain a variable reaction pressure on the reaction pistons. The flow control valve shown in FIG. 4 may be similar to the flow control valve illustrated, for example, in prior art U.S. Pat. No. 4,199,304 issued to Strikis, Halacka and Crain, which is assigned to the assignee of my invention.

The steering gear and the valve arrangement in the FIG. 4 construction are similar to that described with reference to FIG. 1 and will not be repeated here. The supply passage for the reaction pressure is distributed to the reaction chambers of the FIG. 4 construction through a reaction pressure passage 110 which corresponds to the passage 80 in the FIG. 1 arrangement. Passage 10 is comprised in part by a hose 112 which, because of its flexibility, prevents transient and instantaneous pressure pulses to a magnitude beyond a desired value.

Flow control valve 114 for the power steering pump comprises valve spool 116 and spaced valve lands 118 and 120 of equal diameter. Spool 116 is biased, as seen in FIG. 4, by valve spring 122. Pump discharge passage 124 communicates with the valve chamber 126 within which valve spool 116 is positioned. Pressure in passage 124 acts on the left hand side of valve land 118. A calibrated flow orifice 128 extends from the valve chamber 126 and acts to distribute flow to the high pressure inlet port for the steering gear which in FIG. 4 is represented by passage 130. This passage corresponds to passage 30 in the embodiment of FIG. 1.

The inlet side of the power steering pump communicates with supply passage or suction pressure passage 132. This communicates with passage 134. Steering gear valve passage 134 corresponds to the passage 58 in the embodiment of FIG. 1.

A valve 114 includes a crossover or feedback passage 136 which distributes a venturi pressure from the calibrated orifice 128 to the end of the spring chamber 126 occupied by the spring 122. This makes the valve 114 respond to the rate of flow to the steering gear. Valve 114 responds also to pressure since the pressure in passage 124 acts on the left hand end of the valve spool 116. As the pump speed increases with increasing vehicle speed the flow control valve spool 116 moves to the right thereby bypassing excess fluid to the return passage 132. This ports the passage 110 to the steering pressure in passage 124. Thereafter when steering maneuvers are undertaken, the reaction pressure $P_R$ in passage 110 acts on the appropriate pair of reaction pistons 96, 98, 100 and 102 thereby resisting rotation of the inner valve element with respect to the valve sleeve and increasing the steering effort in proportion to the magnitude of the pressure in passage 124.

At lower speeds when the valve land 118 interrupts direct communication between passage 124 and passage 110, passage 110 is subjected to the pressure in the return passage 132. Thus the reaction pressure $P_R$ is lower. This decreases the magnitude of the steering effort, which is desirable during low speed driving maneuvers and during parking operations.

In FIG. 5 I have shown a modification of the flow control valve illustrated in FIG. 4. It is similar in function except that the speed responsive effect of the changing reaction pressure on steering efforts occurs in multiple stages depending upon the number of control orifices. In FIG. 5 there are two such orifices identified by reference numerals 138 and 140 although more orifices could be used if more complete control is desired. The valve of FIG. 5 has elements that correspond to the elements of the valve of FIG. 4 and these have been identified by similar reference characters although prime notations are added.

In the FIG. 5 drawing the valve spool 116' is shown in a position such that port 138 is uncovered while port 130 continues to communicate with low pressure passage 132'. Port 138 communicates with the higher pressure in passage 124. The valve spool 116' is shown in an intermediate speed operating mode. At low speeds both ports 138 and 140 are covered so that the magnitude of the pressure in reaction pressure passage 110' is equal to the lower pressure in passage 132'. During operation in the highest speed mode both ports 138 and 140 are uncovered so that the reaction pressure in passage 110 is determined by the steering pressure in passage 124.

The valve of FIG. 5 provides a gradual increase in the steering effort as speed increases as it increases gradually the proportionality of $P_R$ to P. It also increases the speed at which the values of $P_R$ and P become equal.

A larger number of ports may be chosen if a greater proportionality is desired. Also the areas of the ports can be changed as desired to provide a change in the shape of the characteristic curve illustrated in FIG. 6 where I have plotted steering pressure against steering wheel effort for low speed operation, for the parking mode and for high speed driving mode. For purposes of illustration the two ports 130 and 140 shown in FIG. 5 are provided with areas that are designated by the symbols $A_1$ and $A_2$. In this case $A_1$ equals $A_2$ and, therefore, $P_R$ is equal to 0.5P when the land 118' is positioned as shown and the magnitude of the pressure in passage 132' is zero.

In FIG. 6 the high speed driving mode is represented by characteristic curve 142 and the parking mode is shown at 144. Representative steering modes at various intermediate speeds are shown at 146 and 148.

Industrial Applicability

The improvements of this invention are useful for rack-and-pinion type power steering gear mechanisms as well as sector gear type steering mechanisms for automotive vehicles.

I claim:

1. A power steering gear mechanism for a vehicle for providing a power assist as steering torque is delivered to a steerable member from a steering shaft;

a valve mechanism having a first valve element connected to the steering shaft and a second valve element connected drivably to the steerable member;

a yieldable torsion element for transferring torque directly to the steerable member from the steering shaft;

a power steering pressure source including a pump that is adapted to be driven at a speed proportional to vehicle speed and having a pressure delivery passage and a flow return passage;

reaction pressure chambers in proximity to said valve mechanism;

pressure responsive pistons in said reaction chambers; and valve means responsive to the pressure in said pressure delivery passage for distributing pressure from said pressure delivery passage to said reaction cylinders at high pump speeds and for connecting the flow return passage of said pump to said reaction chambers at lower pump speeds.

2. The combination as set forth in claim 1 wherein said valve means comprises a selector valve spool;

separate passages communicating with the high pressure side and the low pressure side of said pump and with said reaction chambers;

said valve spool being subjected at one side thereof to the pressure on the inlet side of said pump and the other side thereof being subjected to the pressure on the outlet side of said pump whereby said reaction chambers are brought into communication with said pressure delivery passage at high pump speeds and with said flow return passage.

3. The combination as set forth in claim 1 wherein said valve means comprises a flow control valve on the discharge side of said pump comprising a valve spool movable between a first position which interrupts communication between the high pressure side and the low pressure side of said pump and a second position where communication is established between both sides of said pump;

a flow delivery orifice in said pressure delivery passage for delivering working pressure to said steering gear;

said valve spool being subjected to the pressure at said orifice on one side thereof thus controlling the degree of bypass of fluid across said valve spool as pump speed changes; and a plurality of control orifices between pressure delivery passage and said reaction chambers;

said orifices being selectively opened upon movement of said valve spool to provide increasing communication between said reaction chambers and said pressure delivery passage upon an increase of speed of said pump.

* * * * *